United States Patent [19]

Schreiberg

[11] 3,977,720

[45] Aug. 31, 1976

[54] CYCLE STORAGE, SHIPPING AND CONVEYING MEANS

[76] Inventor: Harry Schreiberg, 5 Fenceline Drive, Gaithersburg, Md. 20760

[22] Filed: July 26, 1973

[21] Appl. No.: 382,941

[52] U.S. Cl. .......................................... 296/137 C
[51] Int. Cl.² ........................................ B60P 3/06
[58] Field of Search ................ 211/17, 20, 22, 21; 196/1 A; 280/402, 423, 400; 105/367; 224/42.03 B; 296/23 R, 23 B, 23 E, 137 E, 137 F, 137 G, 137 H, 137 C

[56] References Cited
UNITED STATES PATENTS

| | | | |
|---|---|---|---|
| 3,116,949 | 1/1964 | Muse | 296/23 B |
| 3,586,365 | 6/1971 | Dickson | 296/137 G |
| 3,734,558 | 5/1973 | Stead | 296/23 R |
| 3,822,798 | 7/1974 | Neff | 296/23 R |

FOREIGN PATENTS OR APPLICATIONS

| | | | |
|---|---|---|---|
| 487,633 | 10/1952 | Canada | 211/22 |
| 71,935 | 4/1943 | Czechoslovakia | 211/22 |

*Primary Examiner*—Stanley H. Tollberg
*Attorney, Agent, or Firm*—Ulle C. Linton

[57] ABSTRACT

A housing for storing, shipping or conveying one or more cycles in upright positions including one or more tracks into which cycle wheels can be detachably inserted, which tracks are mounted within a housing having a closure and which housing can be mounted on a supporting surface, shipped or towed.

3 Claims, 11 Drawing Figures

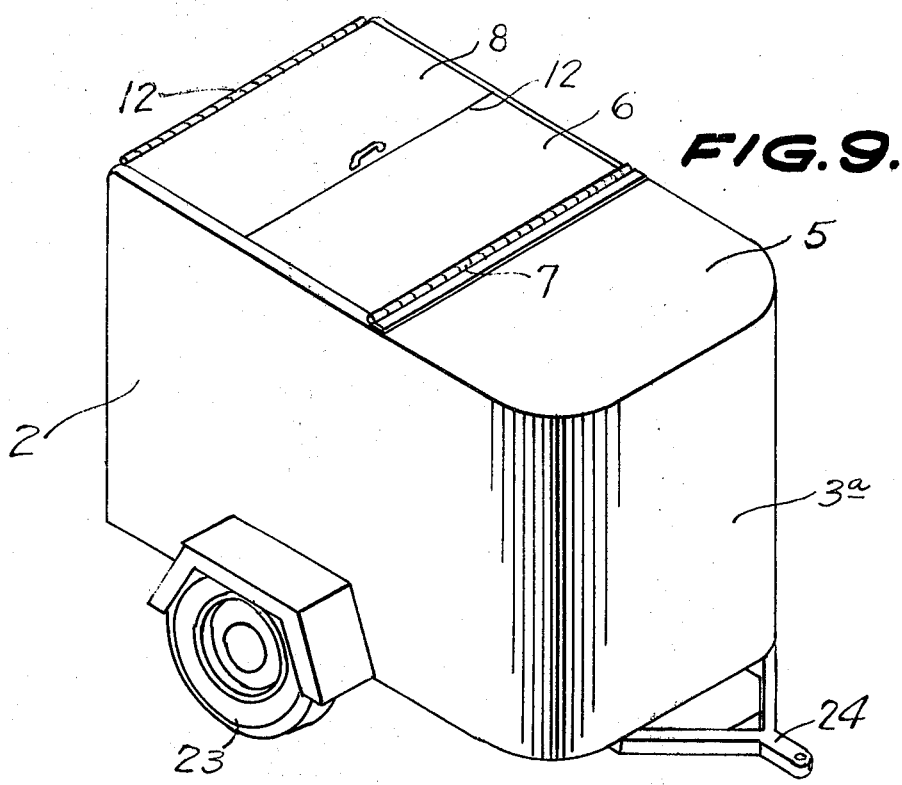
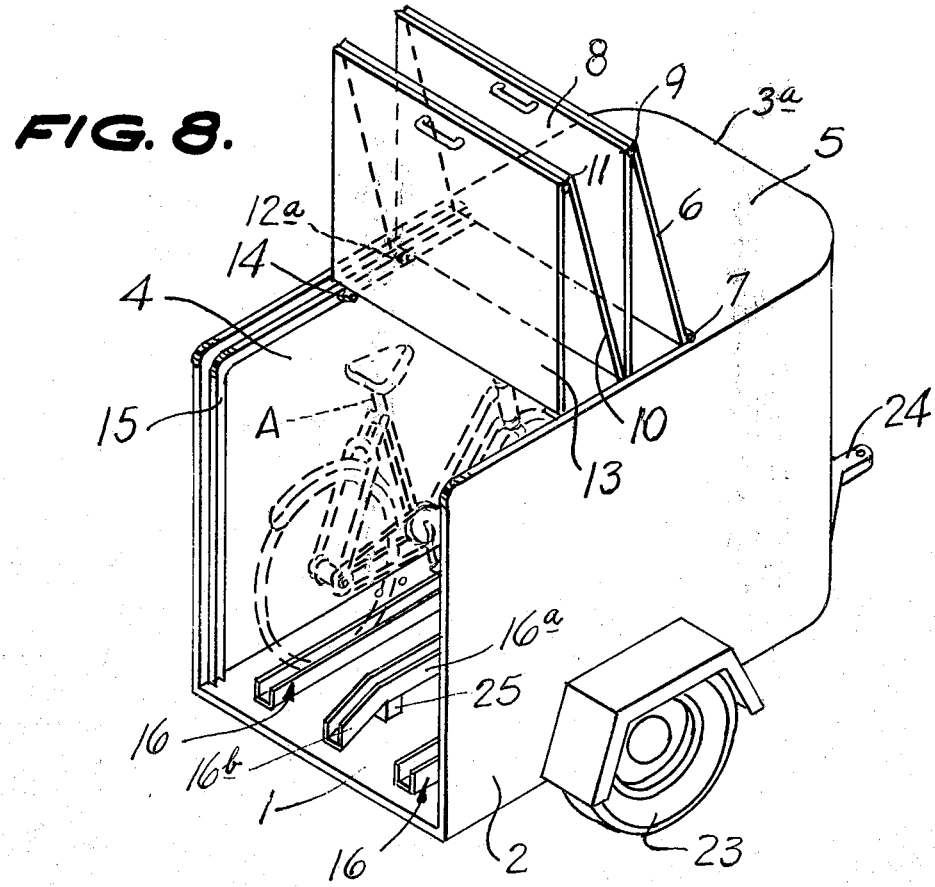

CYCLE STORAGE, SHIPPING AND CONVEYING MEANS

The present invention is concerned with a housing for the storage, shipping or conveying of cycles.

The principal object of the invention is to provide a cycle housing having an opening with closure therefore and at least one track in the housing capable of receiving the wheels of a cycle and supporting the cycle in an upright position and which housing can be positioned on a supporting surface such as the ground, shipped in trucks or freight cars or have wheels and whereby the housing can be towed by a vehicle and which housing will provide protection from inclement weather and theft.

Further objects of the invention will be in part pointed out and obvious from the following description of the accompanying drawing, in which, FIG. 1 is a perspective view of a portion of an open top housing showing one bicycle positioned therein.

FIG. 2 is a longitudinal section of the housing, reduced size, when closed and having wheels for towing, FIG. 3 is a top view of the housing with the closure removed and including a modified form of track, FIG. 4 is a sectional view of portion of FIG. 3 taken on line 4—4 of FIG. 3, FIG. 5 is an end view of FIG. 3, FIG. 6 is a top view of FIG. 2 with the closure removed and including a plurality of tracks, FIG. 7 is a partially broken sectional view taken on line 7—7 of FIG. 6, FIG. 8 is a perspective enlarged rear view of a towable housing with a modified arrangement of tracks, FIG. 9 is front perspective view of the towable housing of FIG. 8 its closed condition.

Figure 1:
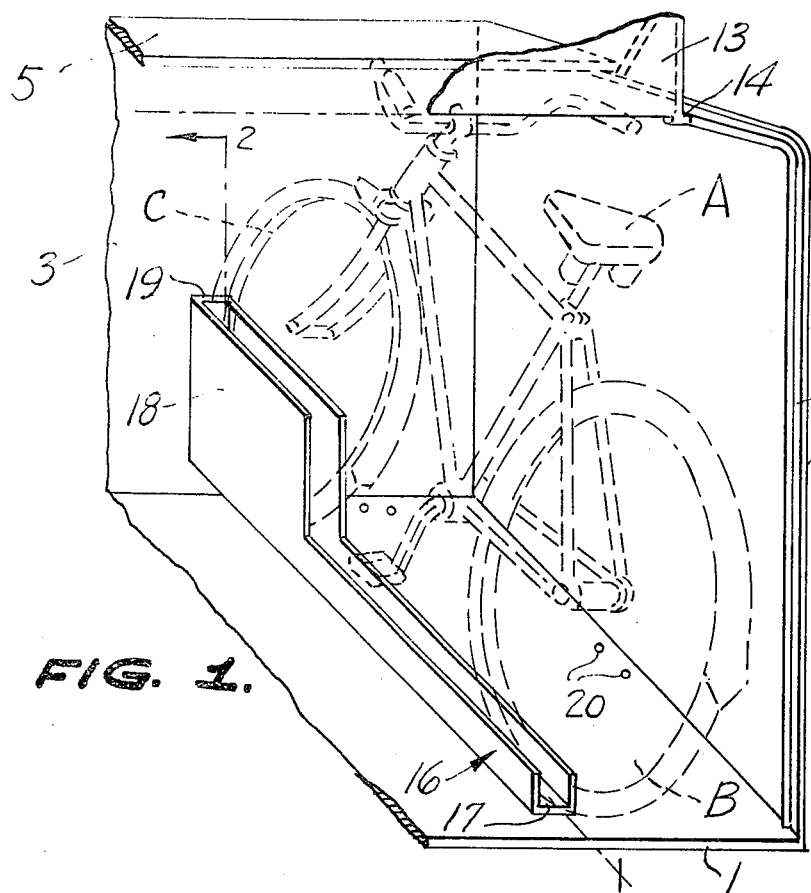

Referring now more particularly to the accompanying drawings in which like and corresponding parts are indicated by like references numeral, wherein numeral 1 is flat bottom of the housing having side walls 2 and 4 and front wall 3. A partial top 5 extends from wall 3 and between portions of side walls 2 and 4 and is fixedly attached thereto. A preferred type of closure for example has sections 6, 8, 10 and 13 with section 6 hinged at 7 to the top 5, section 8 hinged at 9 and 12 to sections 6 and 10, sections 10 is also hinged at 11 to section 13. Tracks 15 are mounted on walls 2 and 4 with rollers 12 a at the end of hinge 12 and rollers 14 on section 13, with said rollers in said tracks. It is to appreciated other types of known closures can be employed.

Figure 2:
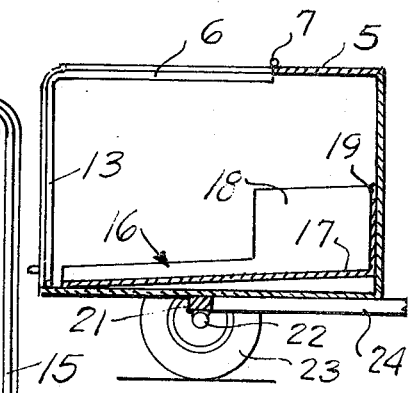

In FIGS. 1 and 2 track 16 is of U-shaped cross-sectional configuration, has bottom 17 fixally attached to housing bottom 1 and enlarged end portion 18 with end 19 attached to front wall 3.

A plurality of holes 20 are provided in bottom 1 for means (not shown) to be driven in the ground or bolts for attachment to the cross-bar 21 of tow bar 24 and axle 22. A pair of wheels 23 are mounted on axle 22.

In FIGS. 1 to 5 a modified track 25 is shown in the housing which track has a straight portion and an enlarge portion 26 extending at an angle to said straight portion. Track 25 is of a U-shape cross-sectional configuration and is attached to bottom 1.

Figure 6:
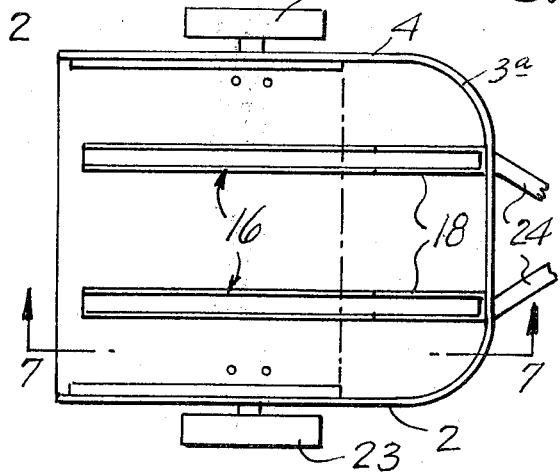
Figure 7:
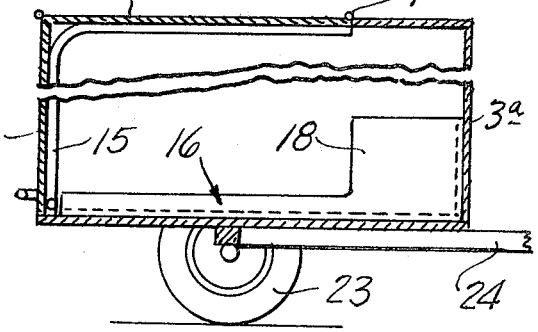

FIGS. 6 and 7 shows the housing with curved front wall 3a and a pair of tracks 16 fixedly mounted therein.

FIGS. 8 and 9 show a mobile housing similar to that of FIGS. 6 and 7, but including a track 16a similar to track 16, but with a downwardly extending end portion 16b and blocks 25 fixedly mounted on bottom 1 and having the bottom of track 16a fixably mounted on said blocks raised from bottom 1.

Figure 10:
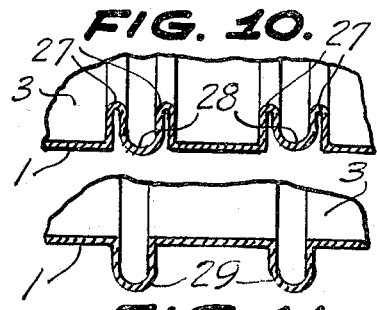
FIG. 10 is a partial end view of a modified form of housing.

FIG. 10 shows a modified form of said housing having a bottom 1a and front wall 3a of metal or plastic, having undulations 27 providing tracks for receiving and supporting the cycle wheels.

Figure 11:
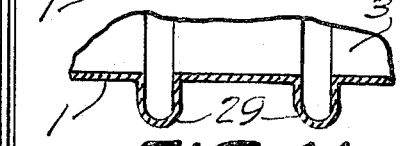
FIG. 11 is a partial end view of a further modified form of housing.

FIG. 11 shows a further modified form of said housing having a bottom 1b and front wall 3b having concave grooves 28 providing tracks for receiving and supporting the cycle wheels.

In the use of the housing of FIGS. 1 and 2, bottom 1 can be placed on the ground or the like and pins driven through holes 20 into said ground. By raising closure 6–13 as shown in FIG. 1, a bicycle A can have its wheels B and C rolled into track 16 and enlarged portion 18 will retain said bicycle upright. Closure 6-13 can be closed as shown in FIGS. 2 and 7 and the bicycle stored therein.

For towing purposes as shown in FIGS. 2, 6 and 7 – 9, bolts can extend through openings 20, cross-bar 21 and axle 22 and have nuts (not shown) added thereto whereby the housing can be towed when desired.

Figure 3:
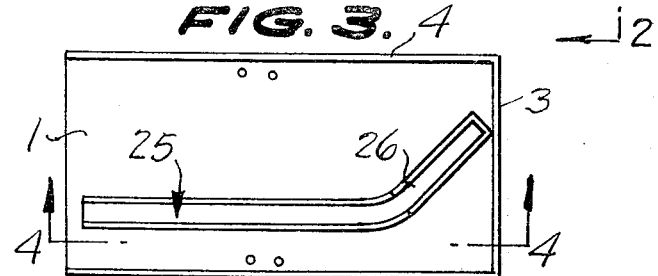
Figure 4:
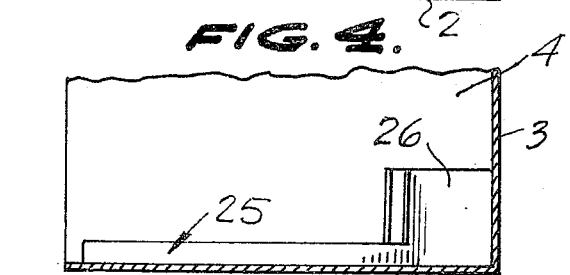
Figure 5:
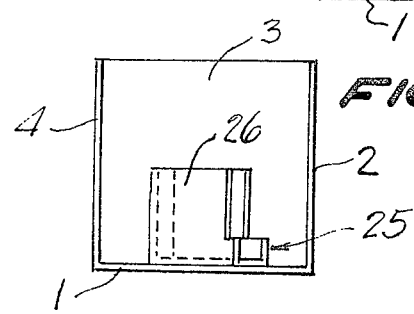

In FIGS. 3–5, track 25 has bent end 26 so that the bicycle wheels can be placed therein with frontwheel C turned at an angle thus requiring a shorter and narrower housing for the bicycle.

In FIGS. 6 and 7 a plurality of bicycles can be mounted with each bicycle in one of the tracks 16.

In FIGS. 8 and 9, three bicycles can be accommadaded with a bicycle in each of tracks 16 and a third bicycle in track 16a raised above the other two bicycles so that the handle bars overlap allowing for a narrow housing.

The term "cycle" is meant to include bicycles, tricycles or motorcycles.

I claim:

1. A cycle housing comprising a housing having a bottom, opposite side walls extending normal and fixed to said bottom and a front wall extending from and between said bottom and said side walls leaving an open end and top to said housing, at least one track having a U-shaped cross-sectional configuration fixedly mounted on said bottom inside said housing and extending normal to said front wall, closure means slideably mounted on and extending between said side walls and capable of closing said housing open end and top when desired, said bottom having holes therein and attaching means extending through said bottom holes.

2. A cycle housing as claimed in claim 1 including a tow bar, an axle, wheels on said axle and said attaching means also detachably extending through said axle and tow bar detachably retaining the same to said housing bottom.

3. A cycle housing as claimed in claim 1 wherein said closure means comprises an accordian type closure having a section fixed to said front wall and extending between corresponding portions of said side walls and a plurality of section hinged together and to said fixed section, tracks on said side walls and rollers carried by said plurality of sections and rollably mounted in said tracks.

* * * * *